Dec. 31, 1940.  W. M. HAESSLER  2,226,717
COMBINED FOLDING STEP, PLATFORM, AND SKIRT ARRANGEMENT
Filed June 3, 1938  6 Sheets-Sheet 1

Fig.1.

INVENTOR
Walter M. Haessler
BY
Donald U. Rich
ATTORNEY

Dec. 31, 1940.  W. M. HAESSLER  2,226,717
COMBINED FOLDING STEP, PLATFORM, AND SKIRT ARRANGEMENT
Filed June 3, 1938  6 Sheets-Sheet 3

INVENTOR
Walter M. Haessler
BY
Donald U. Rich
ATTORNEY

Dec. 31, 1940.   W. M. HAESSLER   2,226,717
COMBINED FOLDING STEP, PLATFORM, AND SKIRT ARRANGEMENT
Filed June 3, 1938   6 Sheets-Sheet 5

INVENTOR
Walter M. Haessler
BY
Donald U. Reid
ATTORNEY

Patented Dec. 31, 1940

2,226,717

UNITED STATES PATENT OFFICE 2,226,717

COMBINED FOLDING STEP, PLATFORM, AND SKIRT ARRANGEMENT

Walter M. Haessler, Berwick, Pa., assignor to American Car and Foundry Company, New York, N. Y., a corporation of New Jersey Application June 3, 1938, Serial No. 211,676

12 Claims. (Cl. 105—447)

This invention relates to folding steps and platforms in general and in particular to constructions for use on railway vehicles in which the folding steps, platform and skirting are combined in a single unit.

In the past vehicles have been constructed in which the steps were rigid and covered by a separate platform located thereabove, thus leaving the outer portion of the steps open. Other constructions have been made in which the steps were rigidly attached to a section of skirting and the entire assembly pivoted to the car structure in such a way that when the steps were inoperative the skirting was substantially in alignment with the car side and the space occupied by the steps was covered by a trap door in most cases independent of the steps. In either case the steps projected downwardly from the car body increasing the air resistance beneath the car and causing considerable trouble in design due to clearances. It is an object, therefore, of the present invention to provide a unit in which the folding steps and platform are combined thus eliminating one element of the old constructions and which unit may be readily controlled from the vehicle vestibule.

A further object of the invention is the provision of a combined trap door and step unit with an attached folding skirt acting to continue the car contour across the step opening area, which unit is so arranged that the step treads remain horizontal at all times with the exception of the lower tread which is carried by the folding skirt.

A yet further object of the invention is the provision of a combined trap door and step unit which is positively supported in either raised or lowered position and can be readily controlled by authorized persons.

A still further object of the invention is the provision of a combined trap door and step unit so constructed as to materially reduce air resistance and in which all parts are so positioned as to permit use of practically any desired center sill and draft gear arrangement.

These and other objects of the invention will be apparent to persons skilled in the art from a study of the following description and accompanying drawings, in which:

Fig. 8 is a sectional view similar to Figs. 1 and 5 but showing a slight modification applicable to either form.

Referring now to the drawings in detail, it will be seen that the construction has been shown as applied to a railway vehicle having the more or less conventional center sill structure 2 carrying a floor 4 thereabove and a side wall structure 6 from which a curved skirting 7 depends to minimized wind resistance of the vehicle. In order to provide for entrance and exit of passengers from the vehicle an opening is provided in the floor and transverse plates 8 applied to the car structure therein to form the more or less conventional passageway, the upper portion of which will be closed by a side door 10 opening inwardly above the level of the car floor. As clearly shown the transverse plates are extended below floor level and if desired may be provided with lights 11 to illuminate the steps later to be described. The customary grab irons 12 may be applied to either side of the opening but are, of course, not necessary to the proper function of the present invention.

Figure 1:
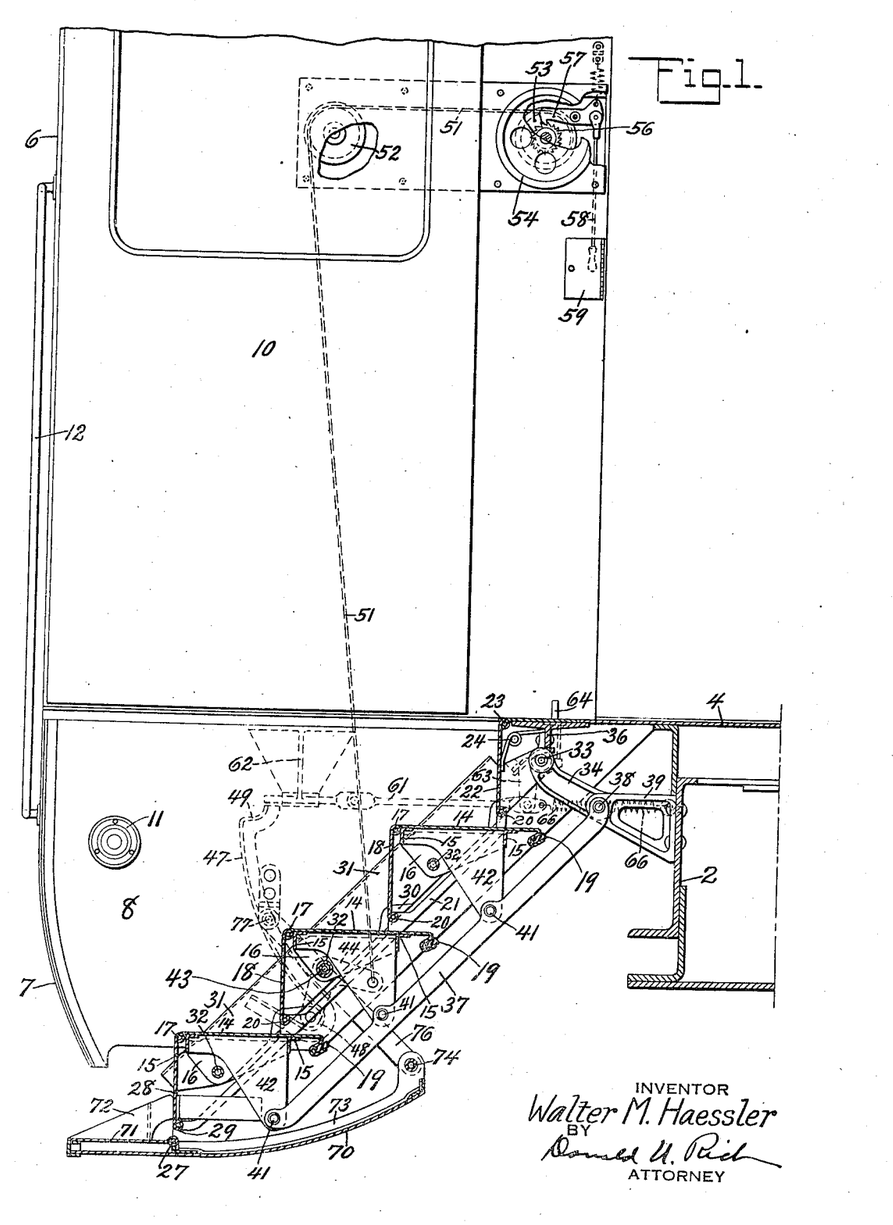
Figure 1 is a sectional view taken through the step opening and showing the combined folding step and platform unit in a lowered position.
Figure 2:
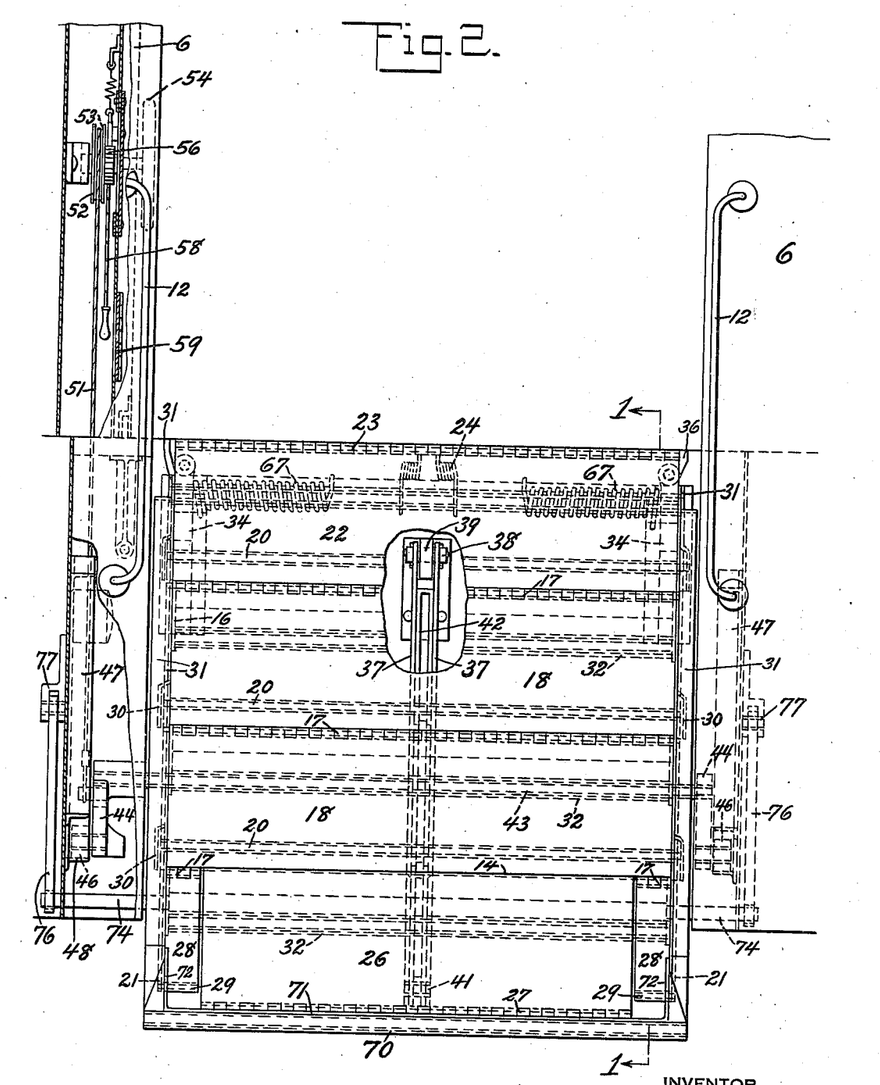
Fig. 2 is a side view of the assembly shown in Figure 1 with portions of the car structure broken away to more clearly show the connection of parts.

The combination folding step and platform unit with attached folding skirt is secured to the car structure in the floor opening and as will later be obvious forms a flight of steps in one position with the passageway open and in the other position forms the platform with the passageway closed. The steps may be made in any desired number and each is formed of a flat tread surface 14 suitably stiffened by angle or other formed stiffeners 15 extending longitudinally thereof and by downwardly directed end flanges 16. The top and intermediate steps have hinged to their outer edges as at 17 along the entire extent thereof a flap or riser 18 with the hinges preferably being of the so-called piano type. The rear edge of each tread surface is pressed to provide a substantially U-shaped pocket in which a rubber or other sealing element 19 may be secured for the purpose of sealing the joints between the respective tread surfaces when these tread surfaces are functioning as a platform. The lower edge of these flaps or risers is pivoted as at 20 to a riser control bar 21, the upper end of which is also pivoted to the lower edge of a vehicle carried riser 22, the upper edge of which is pivoted as at 23 to the car structure adjacent the floor level and constantly urged outwardly by means of torsion springs 24. The lowermost riser is of slightly differing form than those previously described in that the central portion 26 (Fig. 2) is rigid with the lower folding step and is provided at its lower edge with a piano type hinge 27 to which the folding skirt and lower tread element is pivoted. The end portions of this lower riser are formed similar to risers 18, that is, with short flaps or auxiliary risers 28 pivoted to the lower step and to the lower end of the riser control bar as at 29. In order to carry and control the movements of the folding steps side control bars 31 are provided pivoted as at 32 to the end flanges 16 of the step members and at their upper ends are pivoted as at 33 to a bracket 34 rigidly connected to the center sill structure and to a T or other stiffening element 36 bracing the car floor adjacent its free edge (Figs. 1 and 4). These side control bars not only assist in controlling the movements of the steps but also are so chosen as to form an end guard for the steps when in lowered position and a sealing element flush with the car floor and platform when the steps are in the raised position. The side control bars have certain portions thereof offset outwardly as at 30 in order to clear the pivotal connections between the riser control bar and its pivotal connection to the risers as clearly shown in Figs. 1 to 4 inclusive. Intermediate control bars 37 are provided which are pivoted at their upper ends as at 38 to a bracket 39 rigidly carried by the center sill or other car structure. The intermediate and lower portions of these control bars are pivotally connected as at 41 to bracket members 42 rigidly secured to the steps and their bracing means. It is thus seen that a parallelogram has been formed with the side control bars 31 and intermediate control bars 37 forming the long sides of the parallelogram, while the short sides are formed by the rigid spacing of pivots 33 and 38 and 32 and 41 thereby insuring that the tread surfaces of each step will remain substantially horizontal during the raising and lowering thereof. It is desirable that the pivots 32 extend beneath the steps and connect the flanges 16 as shown, thus rigidifying and strengthening the structure and at least one of these pivots is tubular and has a rod or tube 43 extending outwardly beyond the side control bars in order to rigidly carry thereon lifting and locking bellcranks 44 which are provided on one end with rollers 46 adapted to ride along a trackway 47 secured to the extensions of the transverse passageway plates. These trackways are preferably formed of angle members having one flange directed outwardly from the transverse wall plates for cooperation with the rollers just mentioned and are so bent as to provide a lower pocket 48 and an upper pocket or recess 49. The end of the bellcrank opposite the roller is connected preferably by a steel cable 51 passing over pulley wheel 52 and anchored, on a rotatable drum 53 carried upon the transverse passageway plates. The rotatable drum is controllable by a hand wheel 54 accessible from the passageway with the reverse rotation controlled by ratchet 56 adapted to be engaged by ratchet dog 57 spring urged into contact with the ratchet and releasable by a pull cable 58, the handle of which is accessible from a door 59 kept locked against opening by unauthorized persons. It is obvious from a description of the mechanism and the showing of Figure 1 that tension applied to the cable will cause a lifting of the bellcrank with the rollers 46 urged tightly against the trackway 47 and as soon as the unit has reached its upper position the tension of the cable will snap the rollers into the pocket 49. In order to release the steps a lock releasing mechanism is provided which in the present instance consists of a plunger 61 slidably mounted in a bracket 62 and pivotally connected to one end of a bellcrank 63 pivotally carried by the car structure with the opposite end connected to a foot treadle plunger 64 extending upwardly into the vehicle passageway. Due to the rigid mounting of the bellcranks 44 upon the pivot rod 32 a single lock release plunger is sufficient since both bellcranks 44 at either end of the steps must operate in unison. The lock release plunger is maintained in a retracted position by means of tension spring 66 while the steps are preferably counterbalanced by torsion springs 67 surrounding the pivot rods 33 and reacting against the T floor stiffener and a shoulder 68 attached to the side control bars 31 (Figs. 2 and 4).

In order to close the opening in the side wall structure at the passageway a movable skirt member 70 is pivoted as previously mentioned at the lower edge of the lower riser 26 and this skirt member is shaped to conform with the rigid skirting carried on the vehicle when in closed position. The skirt member is provided on its upper inner surface between its upper edge and the pivot 27 with a plate 71 which forms the lowermost tread surface of the flight of steps and this tread plate has attached thereto adjacent its ends cam plates 72 adapted to contact and control the movements of the auxiliary flaps or risers 28 previously referred to. The skirting member is stiffened by means of angle or other bars 73 with at least certain of these bars having enlargements adjacent their lower ends to form pivot points 74 to pivotally mount one end of skirt control bars 76, the other end of which is pivotally connected as at 77 to the side of the transverse wall plate opposite the step opening.

The operation of this combined step, platform and skirt unit is believed obvious but in order to further clarify the description the operation will now be described. With the steps in the lowered position as shown in Figure 1 turning of the hand wheel 54 will cause cable 51 to lift bellcrank 44 forcing roller 46 into engagement with trackway 47 along which it will roll until such time as it snaps into supporting pocket 49. In this position the step tread surfaces will form the platform as clearly shown in Fig. 3 and it is impossible for the same to collapse due to the fact that the ratchet 56 locks the drum and the bellcranks 44 are resting in the supporting pockets 49 of the trackway. During the raising of the step unit under control of the cable the side and intermediate control bars 31 and 37 respectively will swing about their pivots 33 and 38 respectively and, since the steps are pivotally connected to these bars and the distance between the pivots cannot change, the tread surfaces will be maintained substantially horizontal at all times. As soon as the step unit starts upwardly the skirt control bars 76 will act to force the skirt member 70 to rotate about the piano hinge 27 causing the cam plates 72 to move the auxiliary lower flaps or risers 28 inwardly. The inward movement of these auxiliary flaps or risers causes through the riser control bar 21 a similar movement of all the risers against the action of the torsion springs 24. The inward movement of these risers permits the step treads to come into their upper position in which position they are located in substantially the same horizontal plane with the sealing elements 19 engaging the adjacent risers and sealing the joints as well as preventing any rattling or vibration thereof. With the steps in the fully raised position in which they form a platform or the equivalent of the present trap door, the skirting member 70 will have assumed its final position in alignment with the vehicle carried skirting and in alignment with the car door 10. It is thus seen that an assembly is provided in which no element projects below the rigid portions of the car during transit, therefore, the question of interference with switches, turn-outs, etc. is eliminated.

Figures 3, 5:
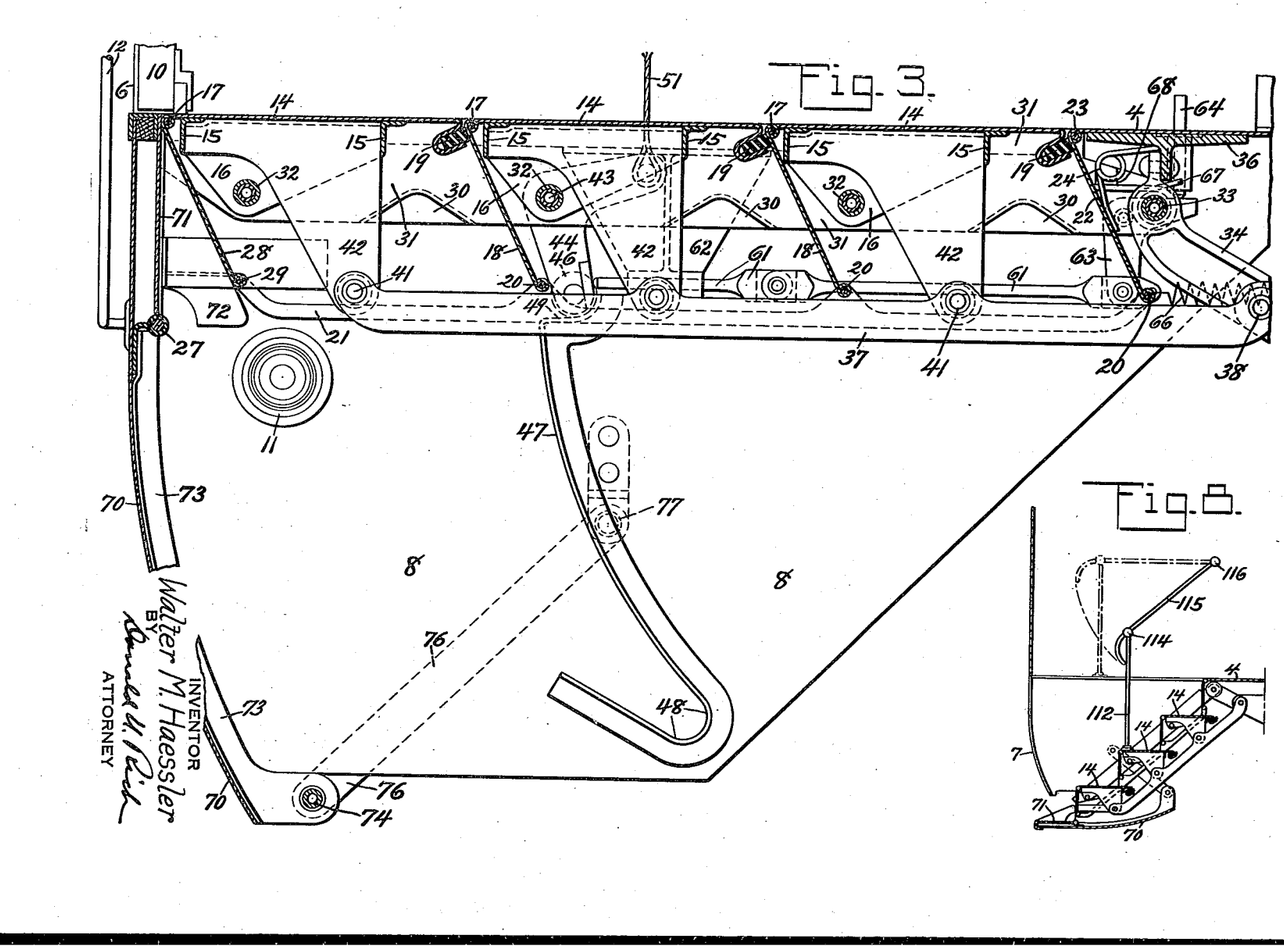
Fig. 3 is an enlarged sectional view of the combined unit in the raised position with the step treads forming the platform.
Fig. 5 is a view similar to Fig. 1, but showing a slightly modified form of arrangement.
Figure 4:
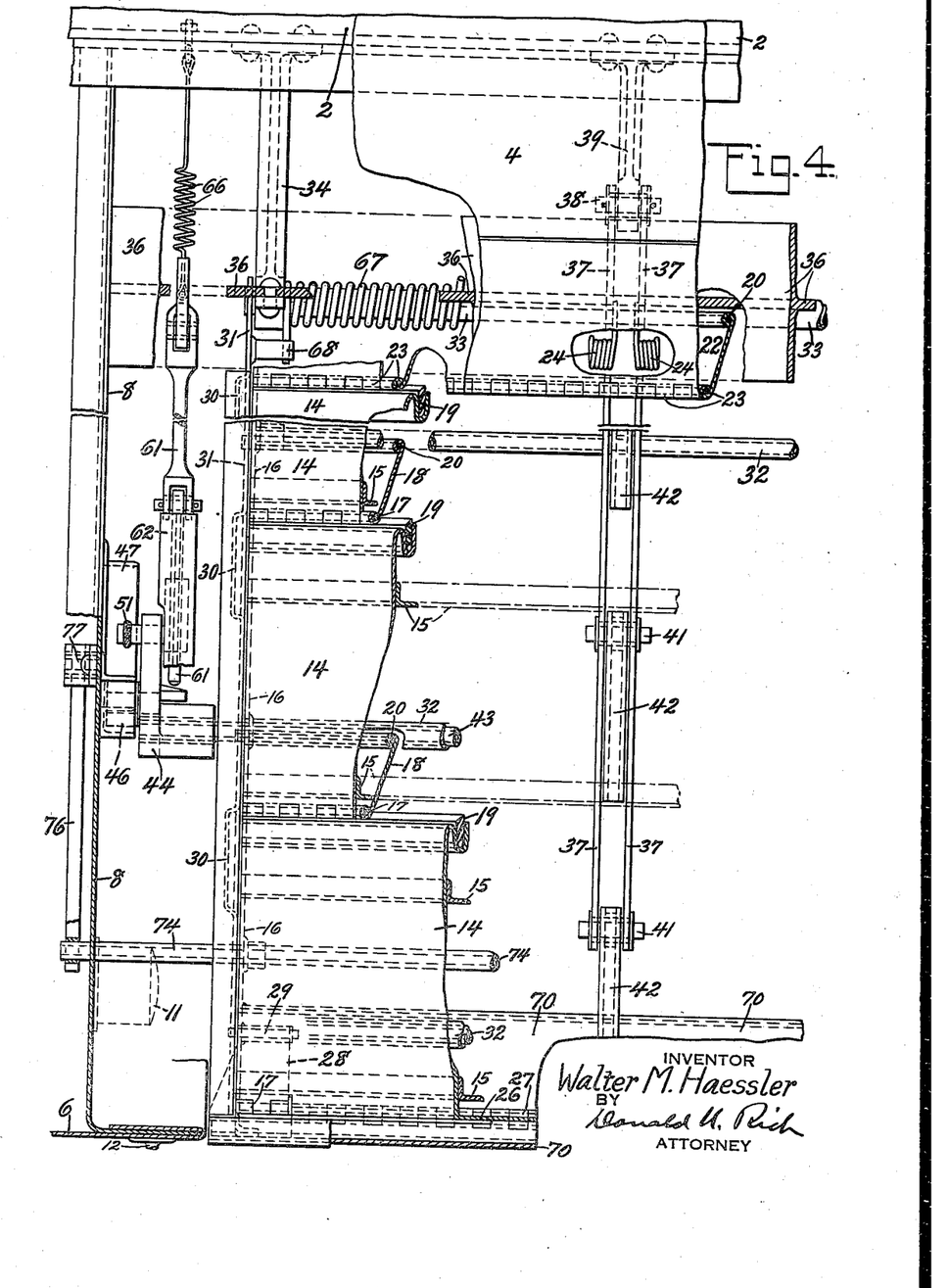
Fig. 4 is a plan view of the mechanism of Fig. 3 with parts broken away to more clearly disclose the construction.
Figures 5, 6:
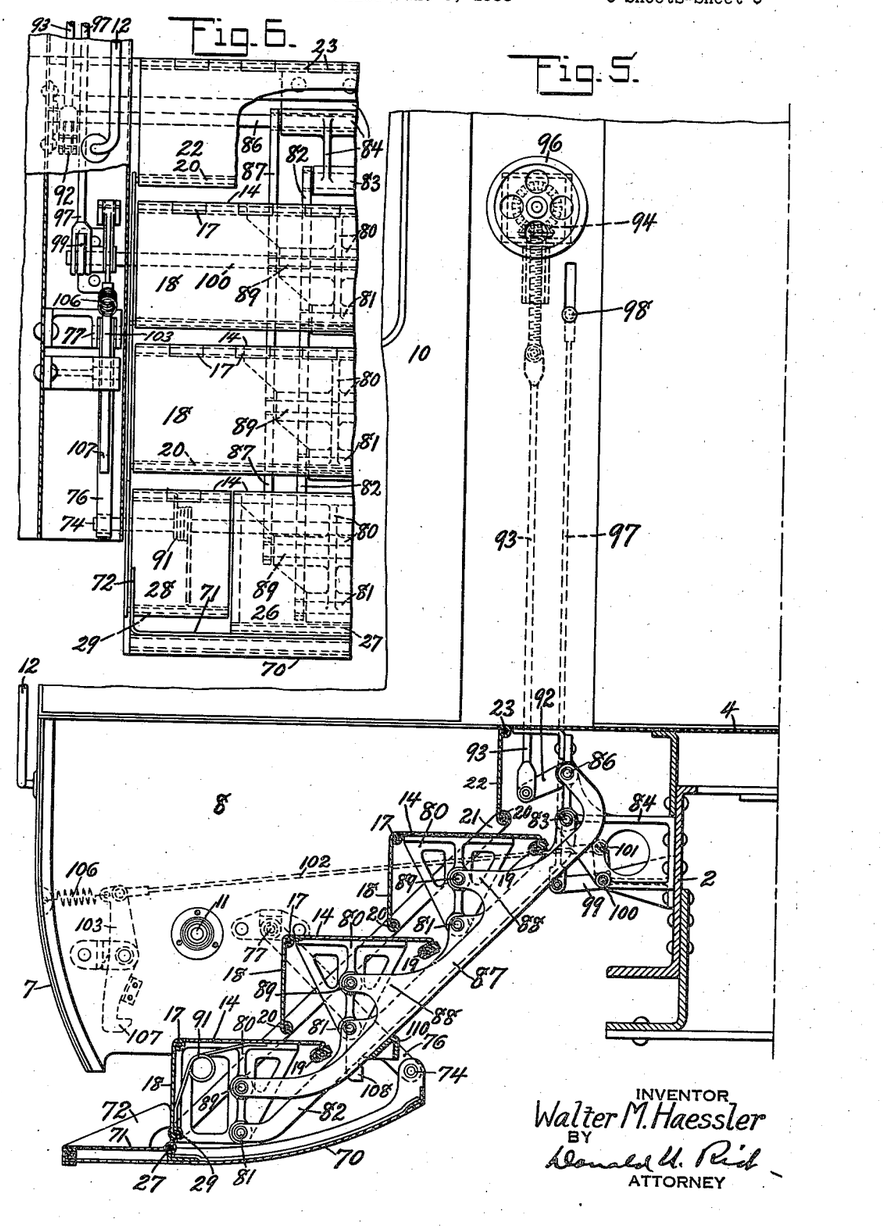
Fig. 6 is a partial view similar to Fig. 2 but showing the modified construction of Fig. 5.
Figure 7:
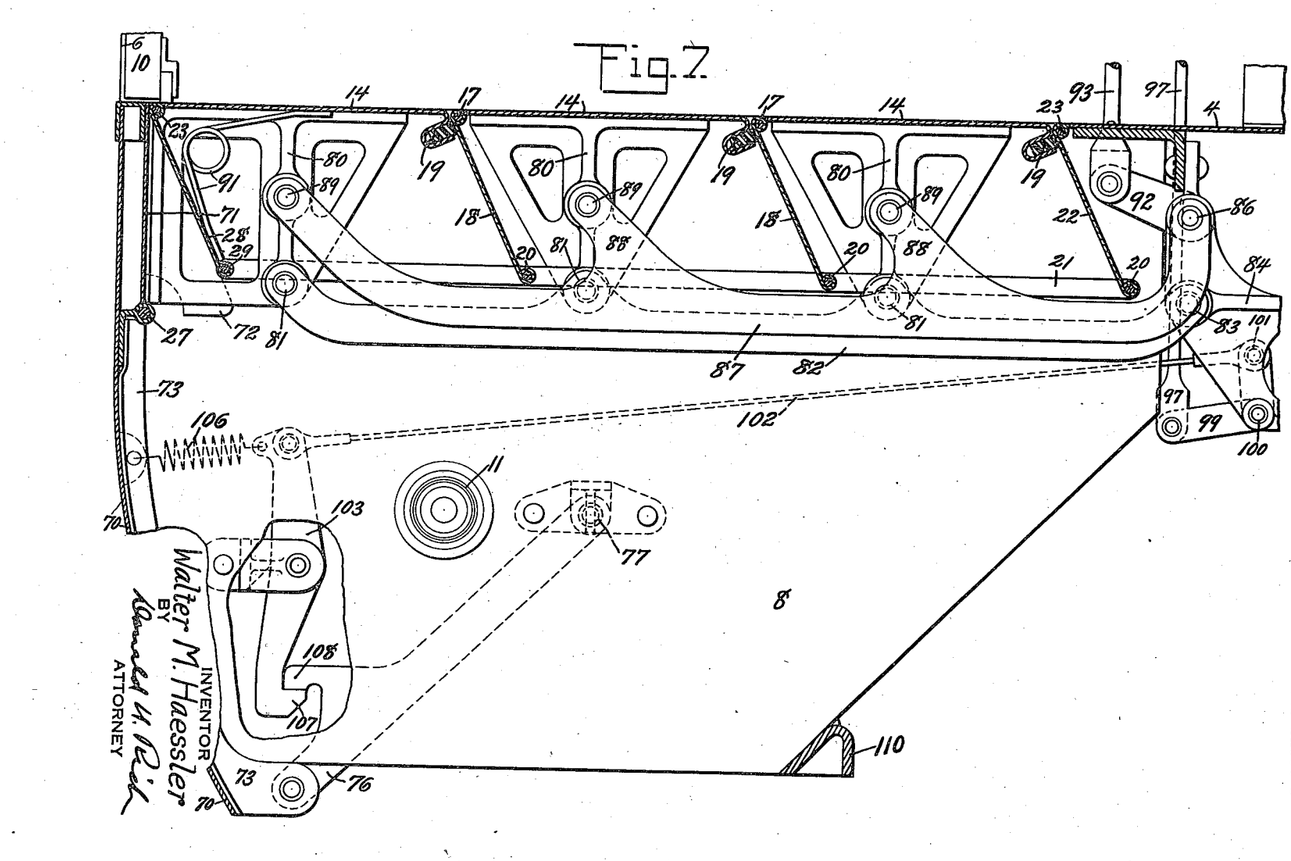
Fig. 7 is an enlarged sectional view showing the construction of Fig. 5 in the raised position.

Referring now to the modification shown by Figs. 5, 6 and 7 it will be seen that the major portion of this form is substantially identical with the form just described and accordingly like reference numerals have been applied to like parts, namely, the steps, risers, skirting and car structure. In this form the structure has been simplified by connecting reinforcing castings 80 to the steps, which castings are provided with a lower portion for reception of pivot 81 extending outwardly therefrom to receive the lower step control bars 82, the upper ends of which are pivoted as at 83 to a car carried bracket 84 rigidly secured to the center sill or similar structure. This bracket is provided with an upper extension providing a pivot mounting for a pivot rod 86 which rigidly carries upper step control bar 87 which has extensions 88 formed thereon to be pivotally connected as at 89 to intermediate portions of the castings 80 previously referred to, thus again it is seen that a parallelogram device has been provided which will insure the maintenance of the step treads in a horizontal position. In this form the risers are maintained in their proper position against the cam plates 72 by means of torsion springs 91 interposed between the auxiliary flaps and the adjacent tread surface of the lower step. In order to lift and control the movements of the step and skirt unit an arm 92 is rigidly connected to the pivot shaft 86 and this arm is in turn pivotally connected to a bar 93 having the upper end threaded for raising or lowering under control of bevel gearing 94 operable through hand wheel 96. The pitch of the screw threads on the rod is preferably such as to be non-reversible, but in order to insure positive retention of the steps in their raised position the locking device is provided. The locking device consists of a rod 97 operable from the passageway by knob 98 and has its lower end pivotally connected to one arm of a bellcrank 99 pivotally carried as at 100 upon the car structure. The other arm of the bellcrank is pivotally connected as at 101 to one end of a pull rod 102, the other end of which is pivotally connected to a latch 103 urged toward latching position by a tension spring 106. The lower end of the latch is provided with a hook 107 adapted to engage a projection 108 formed on the skirt control bar or bars 76. It is thus seen that since the skirt member cannot move downwardly, neither can the step unit since it is directly pivoted as at 27 to the skirt. In order to provide a lower position to relieve the operating mechanism a tie bar 110 is provided extending between and rigidly attached to the lower edge of the transverse passageway plates, which bar will engage the lower and upper step control bars to limit the downward swinging movement thereof.

In order to operate this modification the latch will first be released by lifting the knob 98 disengaging the latch from the projection 108, after which a turning of the hand wheel will cause the combined step and skirting arrangement to be lowered under positive control of the hand wheel from the position shown in Fig. 7 to the position shown in Fig. 5. Reversal of the operation of the hand wheel will cause lifting of the step and skirt unit until such time as the latch automatically engages the projection and the steps are held rigidly in their raised position.

In the slight modification shown by Fig. 8 a folding hand rail has been provided by securing a post 112 rigidly to one end of one of the step units with its upper end pivotally connected as at 114 to an upper rail 115 which in turn is pivotally secured as at 116 to the car structure. With this added feature a hand rail is provided which will raise and lower with the step unit and it is obvious that although it has been shown as applied to the form of Figs. 1 to 4 inclusive, it is equally applicable to the form shown in Figs. 5 to 7 inclusive.

While the invention has been shown and described in detail, it is obvious that various modifications other than those shown and various rearrangements of parts will be apparent to persons skilled in the art and all such modifications and rearrangements of parts are contemplated as fall within the scope of the following claims.

What is claimed is:

1. In a vehicle, a vehicle body having a side wall and a floor positioned above the lower edge of the side wall, an opening in the side wall and floor providing a passageway giving access to the body interior, a door closing the entire side wall opening above the floor level, a skirt portion normally closing the side wall opening below the floor level and forming a continuation of the side wall across the opening, a combined step and platform unit carried by the vehicle adjacent the floor opening, said unit being movable from one position in which it forms a platform closing the floor opening to another position in which it clears the opening and forms a flight of steps, said skirt portion being pivotally connected to said unit and movable therewith to open and close the entire side wall opening below the floor level and to form the lowermost tread surface of the flight of steps, means controlling the movements of said unit, and additional means independent of said means and pivotally connecting said vehicle and skirt portion together for positively controlling the movements of said skirt portion.

2. In a vehicle, a vehicle body having a side wall and a floor, an opening in the side wall and floor providing a passageway giving access to the body interior, a combined platform and step unit carried by the vehicle adjacent the floor opening, said unit comprising a plurality of plates movable to positions in which they form either step treads in the passageway or a platform closing the floor opening, means connecting said plates to move the same to said positions, a plurality of additional plates pivotally secured to said first named plates and movable to positions forming step risers, and control means for said additional plates, said control means including resilient means urging the additional plates into step riser forming position.

3. In a vehicle, a vehicle body having a side wall and a floor, an opening in the side wall and floor providing a passageway giving access to the body interior, a combined platform and step unit carried by the vehicle adjacent the floor opening, said unit comprising a plurality of horizontally disposed plates movable to lowered or raised positions in which they form respectively either step treads in the passageway or a platform closing the floor opening, a plurality of control bars connected to said plates to move the same to said positions and maintain the plates in the horizontal disposition at all times, means connecting certain of said control bars together, lock means carried by said means, and operating means connected to said lock means for raising and lowering the unit, said lock means being automatically operable after the unit is raised to retain the same in platform forming position.

4. In a vehicle, a vehicle body having a side wall and a floor, an opening in the side wall and floor providing a passageway giving access to the body interior, a combined platform and step unit movably carried by the vehicle adjacent the floor opening, said unit comprising a plurality of plates movable to positions in which they form either step treads in the passageway or a platform closing the floor opening, additional plates pivoted to said first mentioned plates and movable relative thereto to form risers when the unit is in step forming position, control bars connected to said first named plates to maintain the same in a horizontal position at all times, and additional control bars independently movable relative to said control bars and connected to said additional plates to control the movements thereof.

5. In a vehicle, a vehicle body having a side wall and a floor, an opening in the side wall and floor providing a passageway giving access to the body interior, a combined platform and step unit movably carried by the vehicle adjacent the floor opening, said unit comprising a plurality of plates movable to positions in which they form either step treads in the passageway or a platform closing the floor opening, additional plates pivoted to said first mentioned plates and movable to form risers when the unit is in step forming position, control bars connected to said first named plates to maintain the same in a horizontal position at all times, additional control bars connected to said additional plates to control the movements thereof, and means controlling the movements of said additional control bars during movement of the said unit.

6. In a vehicle, a vehicle body having a side wall and a floor, an opening in the side wall and floor providing a passageway giving access to the body interior, a combined platform and step unit movably carried by the vehicle adjacent the floor opening, said unit comprising a plurality of plates movable to positions in which they form either step treads in the passageway or a platform closing the floor opening, additional plates pivoted to said first mentioned plates and movable to form risers when the unit is in step forming position, control bars connected to said first named plates to maintain the same in a horizontal position at all times, additional control bars connected to said additional plates to control the movements thereof, and means controlling the movements of said additional control bars during movement of the said unit, said means consisting of a skirt portion pivotally connected to the said unit and vehicle and normally closing the lower portion of the side wall opening.

7. In a vehicle, a vehicle body having a side wall and a floor, an opening in the side wall and floor providing a passageway giving access to the body interior, a combined platform and step unit movably carried by the vehicle adjacent the floor opening, said unit comprising a plurality of plates movable to positions in which they form either step treads in the passageway or a platform closing the floor opening, control members pivotally connected to said plates and vehicle to maintain the plates in a horizontal position at all times, operating means connected to said control members to move the same, and lock means to retain said unit in platform forming position, said lock means being directly connected to said operating means and automatically operable after raising of the unit to retain the unit in platform forming position.

8. In a vehicle, a vehicle body having a side wall and a floor, an opening in the side wall and floor providing a passageway giving access to the body interior, a combined platform and step unit movably carried by the vehicle adjacent the floor opening, said unit comprising a plurality of plates movable to positions in which they form either step treads in the passageway or a platform closing the floor opening, additional plates pivoted to said first mentioned plates and movable to form risers when the unit is in step forming position, control bars connected to said first named plates to maintain the same in a horizontal position at all times, additional control bars connected to said additional plates to control the movements thereof, means controlling the movement of said additional control bars during movement of the said unit, said means consisting of a skirt portion pivotally connected to said unit and vehicle and normally closing the lower portion of the side wall opening, and lock means engageable with a portion of said last named means to retain said unit in platform forming position.

9. A combined vehicle platform and step unit comprising, a plurality of flat plates, bracing means secured to said plates, a pair of control bars pivoted to said bracing means and vehicle at spaced points and forming a parallel motion device, a plurality of additional plates pivotally secured to said flat plates at the outer edges thereof, additional control bars independently movable relative to said control bars and pivotally connected to said additional plates to control the movements thereof, and operating means connected to the unit to raise and lower the same to form either a vehicle platform or a flight of steps, said additional plates forming step risers when the unit is lowered and being disposed beneath said flat plates when the unit is raised.

10. A combined vehicle platform and step unit comprising, a plurality of flat plates, bracing means secured to said plates, a pair of control bars pivoted to said bracing means and vehicle at spaced points and forming a parallel motion device, a plurality of additional plates pivotally secured to said flat plates at the outer edges thereof, additional control bars pivotally connected to said additional plates to control the movements thereof, operating means connected to the unit to raise and lower the same to form either a vehicle platform or a flight of steps, and control means carried at least in part by the unit for effecting movement of said additional plates relative to said flat plates during raising and lowering of the unit whereby said additional plates will form step risers when the unit is in lowered position.

11. A combined vehicle platform and step unit comprising, a plurality of flat plates, bracing means secured to said plates, a pair of control bars pivoted to said bracing means and vehicle at spaced points and forming a parallel motion device, a plurality of additional plates pivotally secured to said flat plates and capable of forming step risers, additional control bars pivotally connected to said additional plates to control the movements thereof, operating means connected to the unit to raise and lower the same to form respectively either a vehicle platform or a flight of steps, said additional plates forming step risers when the unit is lowered, and resilient means urging said additonal plates into the step riser forming position.

12. A combined vehicle platform and step unit comprising, a plurality of flat plates, a pair of control bars pivotally connected to said flat plates and vehicle at spaced points and forming a parallel motion device, a plurality of additional plates pivotally secured to said flat plates and capable of forming step risers, additional control bars pivotally connected to said additional plates to control the movements thereof, operating means connected to the unit to raise and lower the same to form respectively either a vehicle platform or a flight of steps, and control means carried at least in part by the unit for effecting movement of said additional plates relative to said flat plates during raising and lowering of the unit whereby said additional plates will form step risers when the unit is in lowered position, said control means including resilient means urging the additional plates into the step riser forming position when the unit is in lowered position.

WALTER M. HAESSLER.